Aug. 4, 1964
G. CORNELIUS
3,143,135
DRAIN MEANS FOR IRRIGATION PIPE
Filed Oct. 27, 1961
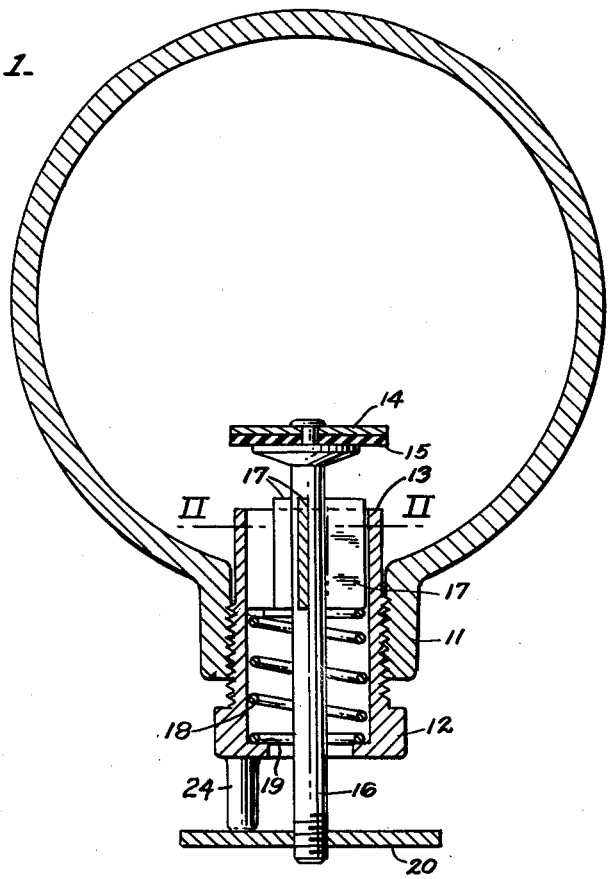
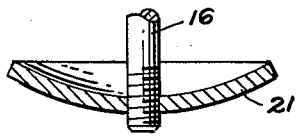
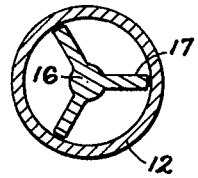
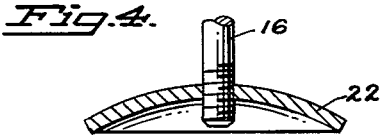
INVENTOR.
GAIL CORNELIUS
BY
Fryer & Tjensvold
ATTORNEYS

United States Patent Office 3,143,135
Patented Aug. 4, 1964

3,143,135
DRAIN MEANS FOR IRRIGATION PIPE
Gail Cornelius, Portland, Oreg., assignor to R. M.
Wade & Co., Portland, Oreg., a corporation of
Oregon
Filed Oct. 27, 1961, Ser. No. 148,216
1 Claim. (Cl. 137—494)

This invention relates to drain means for emptying irrigation pipe preparatory to moving it from one location to another.

It is common practice in irrigating large fields particularly with sprinkler type irrigation to employ a pipe line extending across the field and connectable to spaced outlets in a supply line extending along one edge of the field. Stand pipes with sprinkler heads are spaced along the pipe line to irrigate an elongated strip of the field and the line is periodically moved from one outlet to the next to effect irrigation of the entire field. In some cases the pipe line is formed of separable links which are detached from each other and carried one by one to the new location and there are also various types of wheels and skids which enable a very long line to be moved as a single unit. In any case, it is necessary to drain the water from the line before moving it in order to reduce its weight, and it is to the accomplishment of this draining that the present invention is directed.

Draining of an irrigation line should be accomplished rapidly upon discontinuing pressure thereto and this is particularly true in lines that are moved as a unit, as the whole line may be moved as soon as the supply of water under pressure thereto is discontinued. Any delay in draining represents wasted time in the entire operation. Draining is also preferably automatically controlled by means which open to drain water upon absence of pressure in the line and close upon the presence of pressure. The drain means should be capable of passing sand and other solid matter found in wells or natural sources which often provide irrigation water, and the discharge of draining water should be distributed over a large area of the ground to prevent erosion and crop destruction which is often caused by a direct forcible flow or jet of water issuing through a drain opening.

It is the object of the present invention to provide drain means for irrigation pipe having all of the above recited desirable features and also to provide a spring opened check valve type of drain adapted to be closed by water pressure augmented by the force or velocity of water passing through it just prior to closing.

Further and more specific objects and advantages of the invention are made apparent in the following specification wherein a preferred form of the invention is described by reference to the accompanying drawing.

In the drawing:

FIG. 1 is a sectional view through an irrigation pipe fitting and through a drain valve embodying the present invention;

FIG. 2 is a section taken on the line II—II of FIG. 1;

FIG. 3 is a fragmentary view showing a modified form of a dispersion disc which forms a part of the valve of FIG. 1; and FIG. 4 is a similar view showing a further modification thereof.

The drain valve of the present invention is designed for use either in the lower side of a coupling used for connecting together two lengths of irrigation pipe or may be placed directly in the pipe itself with suitable connecting means. In FIG. 1 of the drawing the coupling is shown in cross section at 10 as having a threaded boss 11 extending downwardly from its underside for the reception of the valve. The valve comprises a threaded open ended housing 12 with an upper end projecting into the coupling and forming a seat 13 for valve element 14 preferably provided with a resilient washer or valve disc 15. The valve stem 16 projects downwardly and is guided in the coupling 12 as by vanes 17 shown as three in number in FIG. 2 and extending radially from the stem 16. A spring 18 is interposed between the lower edges of the vanes 17 and a shoulder 19 formed in the lower end of the housing. The spring serves to hold the valve in the open position shown when the line of which the coupling 10 forms a part is not charged with water under pressure. A dispersion plate 20 is threaded or otherwise suitably secured to the bottom end of the valve stem 16 and spaced a short distance below the lower or outlet end of the housing 12.

In operation, water under pressure in the line holds the valve 14 against the seat 13 and when pressure is reduced, as by closing the valve controlling the supply of water to the line, the spring 18 raises the valve to the position shown and the contents of the line escapes downwardly through the housing 12 striking the dispersion plate 20 which spreads it outwardly in a large circular patern to prevent erosion of soil and destruction of crops by the jet which would otherwise issue from the lower end of the housing.

The proportions of the parts and the size of the spring 18 are such that the valve element 14 is held at a considerable distance above the valve seat 13 providing ample space for a full flow of water to the valve housing to insure rapid discharge of water from the pipe line, it being understood that there may be one such valve in each coupling or in each length of pipe in the line. This large opening of the valve would under ordinary circumstances prevent or delay closing of the valve upon admission of water under pressure to the pipe because such a large quantity of water could escape and the time for building up pressure sufficient to close the valve would be excessive. With the present construction, however, the first flow of water into the pipe is accompanied by downward flow through the valve housing 12 at higher velocity than water being drained so that water impinges the dispersion plate 20 providing weight and a force which tends to overcome the force of the spring 16 moving the valve stem and valve element 14 downwardly to partially close the valve, reduce the amount of escaping water and hasten the full closing of the valve by pressure in the pipe line. Thus the dispersion plate performs the dual purpose of preventing a destructive jet of water from impinging the ground and of hastening the closing of the valve when water under pressure is introduced to the pipe.

The shape of the dispersion plate 20 as well as its size may be varied to produce different effects and alternate shapes are shown in FIGS. 3 and 4. In FIG. 3, the dispersion plate shown at 21 is concave on its upper surface to produce a greater closing effect. In FIG. 4, the convex upper surface of the dispersion plate shown at 22 has an opposite effect so that with variations in contour and size the dispersing effect and the valve closing effect of the plate may be chosen to obtain desired results.

The body 12 is provided with a pair of integrally formed pins only one of which is shown at 24 which extend downwardly for engagement with the diversion disc 20 when the valve is open. This establishes a preload on the spring 18 which prevents unnecessary movement of the valve as the pipe is rolled from one position to another. It also holds both the valve and diversion disc in a centered or fully open position to insure draining at a maximum rate and insures against the disc being drawn upwardly to close the lower end of the valve housing as a result of vacuum or low pressure conditions which can occur due to rapid flow of water within the pipe.

The upper end of the valve body projects into the pipe a very short distance so as to provide a minimum obstruction tending to trap sand or debris.

The valve of the present invention is of very inexpensive manufacture and provides a large capacity discharge means capable not only of discharging water rapidly, but also of passing sand, small gravel and other solid particles which may be carried by the water. Furthermore foreign matter is unlikely to lodge on the valve seat because of the fact that it faces upwardly and presents but a small surface to receive such matter.

I claim:

Drain means for use in a sprinkler irrigation system having a movable cylindrical line connectable with a source of water under pressure, spaced sprinklers thereon and spaced drain means therein for draining the line before it is moved, each said drain means being in the form of a valve including a tubular housing extending from below upwardly into the line to a level substantially above the lower inner cylindrical surface of the line, a valve element for closing the upper end of said housing, a valve stem on said element extending downwardly through the housing, spring means urging the valve and stem upwardly to open the valve, stop means limiting the opening movement, a dispersion plate comprising a disc on the lower end of the valve stem concentric with the housing, said stop means limiting upward movement of the valve stem to a point where the dispersion plate is spaced from the lower end of the housing a distance to permit unimpeded drainage through the housing, and said dispersion plate serving to disperse discharging water to reduce the force of impingement thereof upon the ground, and also serving to load the spring when the line is again charged with water to hasten closing of the valve.

References Cited in the file of this patent

UNITED STATES PATENTS

| | | |
|---|---|---|
| 337,236 | Briscoe | Mar. 2, 1886 |
| 472,116 | Gold | Apr. 5, 1892 |
| 1,294,953 | Salt | Feb. 18, 1919 |
| 2,003,678 | Gilley | June 4, 1935 |
| 2,179,460 | White | Mar. 7, 1939 |
| 2,647,533 | Beymer | Aug. 4, 1953 |